United States Patent
Yan et al.

(10) Patent No.: US 8,160,098 B1
(45) Date of Patent: Apr. 17, 2012

(54) DYNAMICALLY ALLOCATING CHANNEL BANDWIDTH BETWEEN INTERFACES

(75) Inventors: Anlu Yan, Boxborough, MA (US); Tong Liu, Boxborough, MA (US); Chad Mikkelson, Boxborough, MA (US); Aimin Ding, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 12/353,946

(22) Filed: Jan. 14, 2009

(51) Int. Cl.
*H04J 3/16* (2006.01)

(52) U.S. Cl. ............... 370/468; 370/232; 370/419

(58) Field of Classification Search ............... None
See application file for complete search history.

(56) References Cited

U.S. PATENT DOCUMENTS

| | | | |
|---|---|---|---|
| 5,592,480 | A | 1/1997 | Carney et al. |
| 5,918,019 | A | 6/1999 | Valencia |
| 6,137,793 | A | 10/2000 | Gorman et al. |
| 6,229,790 | B1 | 5/2001 | Butrym et al. |
| 6,434,141 | B1 | 8/2002 | Oz et al. |
| 6,819,682 | B1 | 11/2004 | Rabenko et al. |
| 6,842,429 | B1 | 1/2005 | Sridhar et al. |
| 6,993,353 | B2 | 1/2006 | Desai et al. |
| 7,065,779 | B1 | 6/2006 | Crocker et al. |
| 7,113,484 | B1 | 9/2006 | Chapman et al. |
| 7,126,920 | B2 | 10/2006 | Venkatesulu et al. |
| 7,139,923 | B1 | 11/2006 | Chapman et al. |
| 7,184,433 | B1 | 2/2007 | Oz |
| 7,218,901 | B1 | 5/2007 | Mobley et al. |
| 7,274,679 | B2 | 9/2007 | Amit et al. |
| 7,292,578 | B1 | 11/2007 | Kerr et al. |
| 7,349,430 | B1 | 3/2008 | Chapman |
| 7,562,168 | B1 * | 7/2009 | Yifrach et al. ............... 710/52 |
| 2002/0052927 | A1 | 5/2002 | Park |
| 2002/0093955 | A1 | 7/2002 | Grand et al. |
| 2002/0106017 | A1 | 8/2002 | Dombkowski et al. |
| 2002/0131403 | A1 | 9/2002 | Desai et al. |
| 2002/0131426 | A1 | 9/2002 | Amit et al. |
| 2002/0133618 | A1 | 9/2002 | Desai et al. |
| 2002/0136203 | A1 | 9/2002 | Liva et al. |
| 2002/0141585 | A1 | 10/2002 | Carr |
| 2002/0154655 | A1 | 10/2002 | Gummalla et al. |
| 2002/0191691 | A1 | 12/2002 | Holborrow |

(Continued)

FOREIGN PATENT DOCUMENTS

WO 0072509 11/2000

OTHER PUBLICATIONS

CABLELABS, Data-Over-Cable Service Interface Specifications DOCSIS 3.0 Security Specification, c. 2006-2007, Cable Television Laboratories, Inc., http://cablemodem.com/specifications/specifications30.html.

(Continued)

*Primary Examiner* — Gregory Sefcheck
*Assistant Examiner* — Daniel Mitchell
(74) *Attorney, Agent, or Firm* — Stolowitz Ford Cowger LLP

(57) ABSTRACT

In one example, a bandwidth allocation device allocates physical channel bandwidth between local interfaces. Thereafter, at a polling time, the bandwidth allocation device determines whether there is communication activity between each local interface and the physical channel. The bandwidth allocation device can then dynamically reallocate the physical channel bandwidth at the polling time according to the communication activity determinations.

17 Claims, 3 Drawing Sheets

U.S. PATENT DOCUMENTS

| | | | |
|---|---|---|---|
| 2003/0002540 A1 | 1/2003 | Eerenberg et al. | |
| 2003/0009765 A1 | 1/2003 | Linden et al. | |
| 2003/0212999 A1 | 11/2003 | Cai | |
| 2004/0161098 A1 | 8/2004 | Suzuki et al. | |
| 2004/0163129 A1* | 8/2004 | Chapman et al. | 725/126 |
| 2004/0244043 A1 | 12/2004 | Lind et al. | |
| 2005/0122966 A1* | 6/2005 | Bowes | 370/360 |
| 2005/0232304 A1 | 10/2005 | Quigley | |
| 2005/0265376 A1 | 12/2005 | Chapman et al. | |
| 2005/0265392 A1* | 12/2005 | Fox et al. | 370/474 |
| 2005/0265397 A1 | 12/2005 | Chapman et al. | |
| 2006/0039380 A1 | 2/2006 | Cloonan et al. | |
| 2006/0168612 A1 | 7/2006 | Chapman et al. | |
| 2007/0049216 A1* | 3/2007 | Karaoguz | 455/90.3 |
| 2007/0053321 A1* | 3/2007 | Beales | 370/329 |
| 2007/0097907 A1* | 5/2007 | Cummings | 370/329 |
| 2007/0098007 A1* | 5/2007 | Prodan et al. | 370/443 |
| 2007/0171905 A1* | 7/2007 | Dai | 370/389 |
| 2008/0095083 A1 | 4/2008 | Sorenson et al. | |
| 2010/0169475 A1 | 7/2010 | Woundy et al. | |

OTHER PUBLICATIONS

Mohanty et al.; "Max-min Utility Fairness in Link Aggregated Systems"; High Performance Switching and routing, 2007, HPSR '07, Workshop On, IEEE, PI; May 1, 2007; pp. 1-7.

European Patent Office; International Search Report and Written Opinion for PCT/US2010/026543; Aug. 3, 2010.

Stolowitz Ford Cowger LLP, Listing of Related Cases, Jan. 13, 2011.

Bhavesh N. Desai et al., "FastChannel: A Higher-Speed Cable Data Service", AT&T Labs Research, 26 pages, Jan. 2002.

Postel, J., "User Datagram Protocol", RFC768, Aug. 28, 1980, 3 pgs.

Postel, Jon, Editor, "DARPA Internet Program Protocol Specification", RFC791, Sep. 1981, 45 pages.

Deering, S., "Host Extensions for IP Multicasting", RFC1112, Aug. 1989.

Droms, R., "Dynamic Host Configuration Protocol", RFC2131, Mar. 1997.

Townsley, W. et al., "Layer Two Tunneling Protocol "L2TP"", RFC2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al.. "An Overview of Source-Specific Multicast (SSM)", RFC 3569, Jul. 2003.

Droms, R., et al., "Dynamic Host Configuration Protocol for IPv6 (DHCPv6)", RFC3315, Jul. 2003.

Droms, R., "Stateless Dynamic Host Configuration Protocol (DHCP) Service for IPv6", RFC3736, Apr. 2004.

Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16-2004, Oct. 1, 2004, 893 pages.

Cable Television Laboratories, Inc., "Data-Over-Cable Service Interface Specifications Modular CMTS", CM-SP-DEPI-W03-050302, 49 pgs., Copyright 2005.

Ramakrishnan, Sangeeta, "Next Generation Edge—Realizing the vision of shared resources and bandwidth", SCTE Conference on Emerging Technologies, Jan. 11-13, 2005, 16 pgs.

Chapman, John T., "Remote PHY Technical White Paper Addendum," Downstream External PHY Interface Specification, Cisco Systems, Inc., EDCS-377253, Jan. 24, 2005.

Cisco Systems, Inc., "Downstream External PHY Interface Specification", SP-DEPI-W2-041101A.DOC, EDCS-408926, Jan. 25, 2005.

Lau, J., et al., "Layer Two Tunneling Protocol—Version 3 (L2TPv3)," RFC3931, Mar. 2005, 94 pages.

Cable Television Laboratories, Inc., "DOCSIS Radio Frequency Interface Specification", CM-SP-RFIv2.0-I10-051209, 538 pgs., Dec. 9, 2005.

Madvinsky, et al., Don't Let Your Modem Be Cloned, Jun. 2000, pp. 1-7, Communications Technology.

Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.

Desai, et al., FastChannel: A Higher-Speed Cable Data Service, AT&T Labs-Research, pp. 1-13, Jan. 2002.

Aboba, et al., Extensible Authentication Protocol (EAP), RFC3748, Jun. 2004, pp. 1-64, Standards Track.

ITU-T Telecommunication Standardization Sector of ITU, Series J: Cable Networks and Transmission of Television, Sound Programme and Other Multimedia Signals, Interactive Systems for Digital Television Distribution, Recommendation J.122, Dec. 2002, 506 pages, International Telecommunication Union.

Stolowitz Ford Cowger LLP, Listing of Related Cases, Jun. 21, 2011.

* cited by examiner

DYNAMICALLY ALLOCATING CHANNEL BANDWIDTH BETWEEN INTERFACES

TECHNICAL FIELD

The present disclosure relates generally to the field of networking.

BACKGROUND

Cable operators have widely deployed high-speed data services on cable television systems. These data services allow subscriber-side devices, such as personal computers, to communicate over an ordinary cable TV network Hybrid Fiber Coax (HFC) cable. A Cable Modem Termination System (CMTS) connects the cable TV network to a data network, such as the Internet. The Data Over Cable Service Interface Specification (DOCSIS) is one of the cable modem standards used for transferring data over the cable TV network.

In a DOCSIS network, the data traffic is classified by specified fields in the data packet headers into service flows (also referred to as flows, sessions, etc. in non-DOCSIS networks), and a scheduling device in the CMTS regulates the packet transmission based on the pre-defined Quality of Service (QoS) parameters associated with the service flows. Examples of the QoS parameters include relative traffic priority, minimum reserved bandwidth, maximum sustained bandwidth, etc. In the downstream direction, the physical transmission of packets is over physical Radio Frequency (RF) channels to the cable modems. Each RF channel has fixed amount of bandwidth based on its modulation characteristics.

In the latest DOCSIS version, version 3.0, each service flow can be transmitted over a single one of the RF channels (non-bonded, also called narrowband), or distributed over a plurality of the RF channels (bonded, also called wideband). Consequently, an RF channel can be used to carry a plurality of narrowband transmissions and/or a plurality of portions of wideband transmissions.

Since a same RF channel can be used to carry a plurality of narrowband transmissions and/or a plurality of portions of wideband transmissions, the CMTS uses a scheduling scheme to keep the transmitted data rate within the maximum transmission rate of the RF channel. Existing scheduling schemes leave a significant portion of available RF channel bandwidth unused under certain circumstances even though buffered data is waiting for transmission on the CMTS. The disclosure that follows solves this and other problems.

DESCRIPTION OF EXAMPLE EMBODIMENTS

Overview

In one example, a bandwidth allocation device allocates physical channel bandwidth between local interfaces. Thereafter, at a polling time, the bandwidth allocation device determines whether there is communication activity between each local interface and the physical channel. The bandwidth allocation device can then dynamically reallocate the physical channel bandwidth at the polling time according to the communication activity determinations.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

Figure 1:
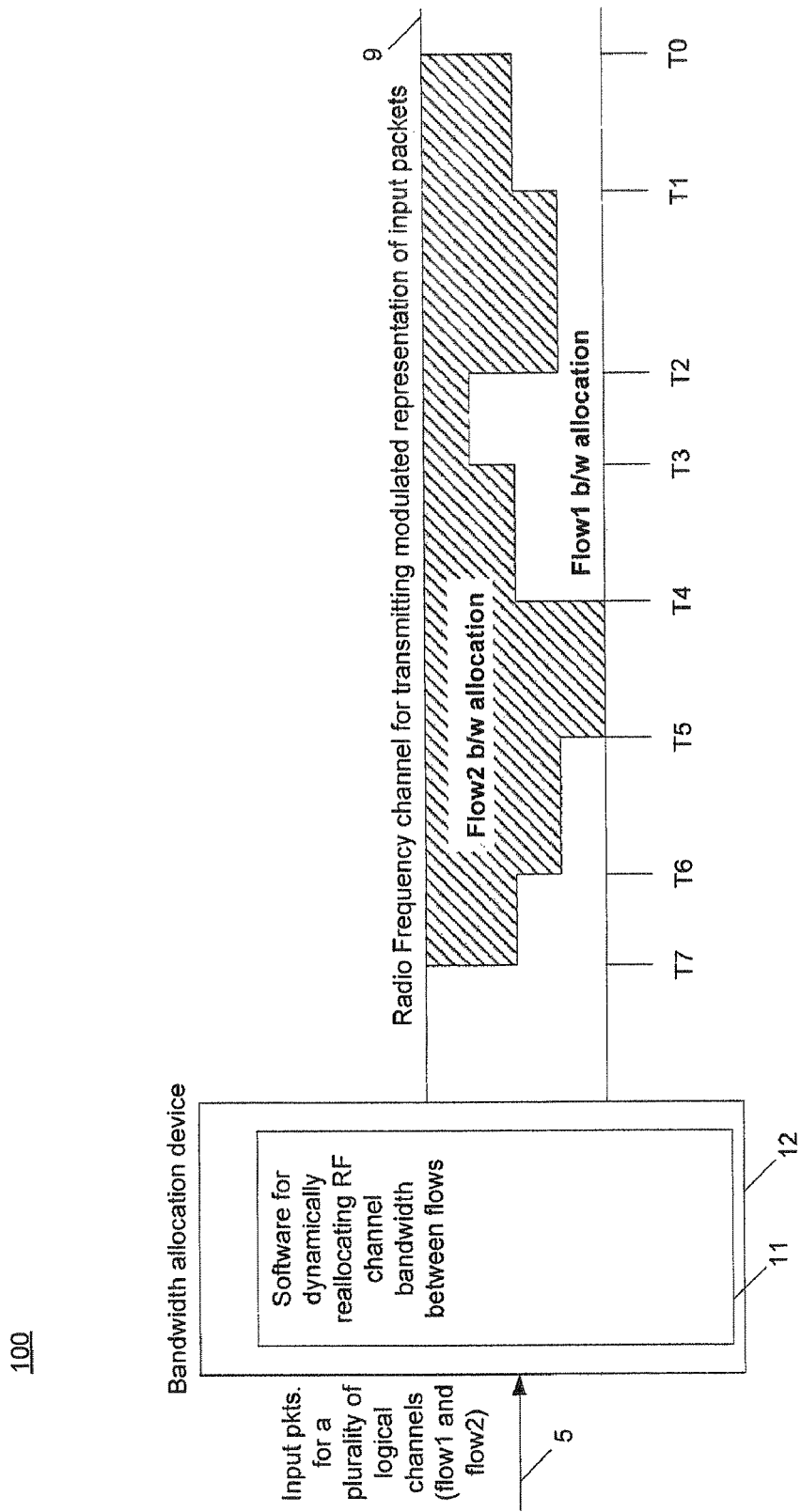
FIG. 1 illustrates one example of a system for dynamically allocating channel bandwidth between interfaces.

FIG. 1 illustrates one example of a system for dynamically allocating channel bandwidth between interfaces.

The example system 100 includes a bandwidth allocation device 12 configured with software 11. The software 11 is configured to dynamically reallocate bandwidth of Radio Frequency (RF) channels, e.g. the RF channel 9, between a plurality of sessions or flows represented by received packets 5.

The RF channel 9 has a finite constant amount of bandwidth available to be allocated between flows. The flows then consume bandwidth on the RF channel up to flow's bandwidth allocation. For example, one of the flows can use its entire bandwidth allocation, or less, but not more. If a flow is not using its entire bandwidth allocation at a particular instant, then the bandwidth of the RF channel 9 is not actually fully utilized at that instant, even though the bandwidth of the RF channel 9 may be fully allocated.

The FIG. 1 illustrates the dynamic reallocation of RF channel bandwidth between flow1 (a first logical channel) and flow2 (a second logical channel) on RF channel 9. In the illustrated example, prior to the time zero (T0) the RF channel bandwidth is fully allocated to flow1. At time zero, the software 11 conducts a dynamic reallocation such that roughly half of the RF channel bandwidth is allocated for each flow. At T1, another dynamic reallocation is performed such that roughly three quarters of the RF channel bandwidth is allocated to flow2 with the remaining quarter allocated to flow1. Other dynamic reallocations are performed at times T2-T7 as illustrated in the FIG. 1.

The dynamic reallocations discussed above can prevent a circumstance from occurring where one flow is buffering data on the bandwidth allocation device because its allocated bandwidth is not sufficient while another flow is temporarily inactive. In such a circumstance, the software 11 dynamically reallocates RF channel bandwidth such that the active flow can access all, or a greater amount, of the channel bandwidth during the period of inactivity in the other flow. For example, the flow1 was inactive at a polling time corresponding to T4, and accordingly, the RF channel bandwidth was dynamically reallocated to flow2 at T4. When monitoring indicated that flow1 resumed activity at a polling time corresponding to T5, a portion of the channel bandwidth was dynamically allocated back to flow1.

For ease of explanation, the FIG. 1 illustrates the bandwidth distribution of a single physical channel. It should be understood that, if either flow1 or flow2 are a bonded flow, such a bonded flow will get bandwidth from one or more other physical channel(s) in a similar fashion as described above. In such cases, the bonded flow sees the aggregated bandwidth it gets from all the physical channels that are part of the bonding group.

It should be apparent from the example above that a cable modem operating downstream from a CMTS configured with the software 11 can realize improved download rates as a result of the dynamic reallocation by the software 11. For example, a cable modem receiving flow2 will get better throughput during a period between T4 and T5 than if the RF channel bandwidth were statically allocated between the flows. It should be appreciated that this improved throughput during the period between T4 and T5 is provided by the software 11, without requiring modifications to the cable modem or the RF channel 9. Furthermore, the modifications on the bandwidth allocation device 12 do not require an increase to a time-averaged amount of bandwidth allocated to flow2, and it is even possible that the dynamic reallocation can improve throughput even while the time-averaged amount of bandwidth allocated to flow2 is reduced.

It should be understood that the system shown in FIG. 1 can make the dynamic reallocation determinations at any time, whether these times be regular intervals or identified by observing a certain condition or event.

It should be understood that the system shown in FIG. 1 can reallocate all of, or a fraction of, bandwidth allocated to a currently inactive flow to a currently active flow. Also, the system shown in FIG. 1 can reallocate a fraction of bandwidth allocated to a flow having reduced activity to another flow. The description of FIG. 2 will discuss particular factors controlling how much bandwidth is reallocated from an inactive flow, or a low activity flow.

It should be apparent that the dynamic reallocation scheme can be applied in any type of network where flows or sessions are allocated bandwidth of a fixed bandwidth channel. The dynamic reallocation scheme is not limited to DOCSIS networks or even cable networks. In any case, the bandwidth allocation device may be located in a single assembly or distributed across a plurality of separate assemblies on a network.

Figure 2:
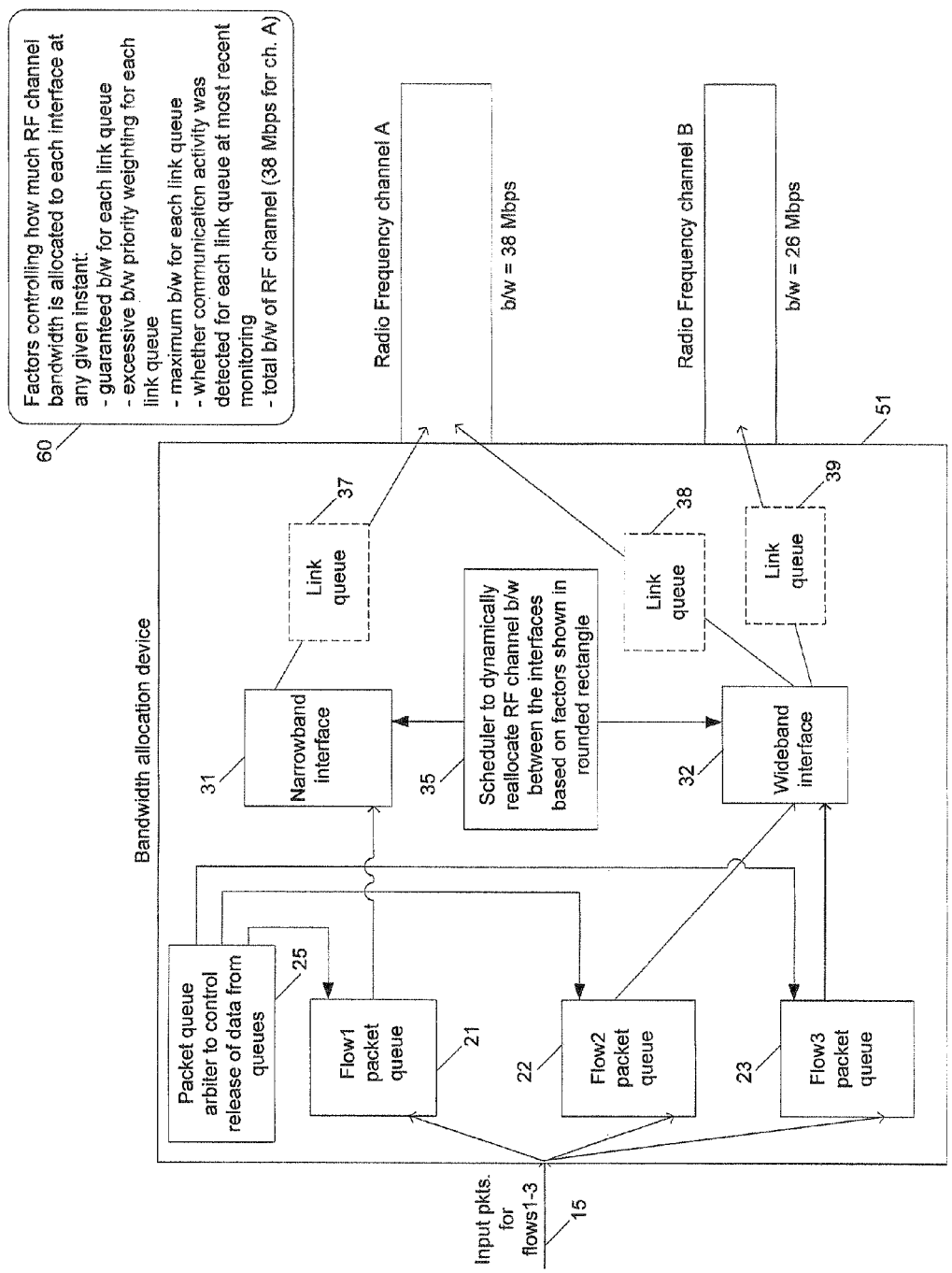
FIG. 2 illustrates one example of a bandwidth allocation device for dynamically allocating channel bandwidth between interfaces.

FIG. 2 illustrates one example of a bandwidth allocation device for dynamically allocating channel bandwidth between interfaces.

The example bandwidth allocation device 51 contains a plurality of packets queues 21-23, each associated with a different subset of flows represented by the input 15. Each of the packet queues 21-23 can be used to buffer data for a single flow (as shown in the illustrated example), or for an aggregated flow.

Depending on whether the packet queue represents flows using bonded channels or non-bonded channel, the packet queues buffer data for transmission from the narrowband interface 31 or the wideband interface 32. For example, the flow1 is designated as narrowband so its packet queue 21 buffers transmission over the narrowband interface 31. In contrast, flow2 and flow3 are designated as wideband so their packet queues 22 and 23 buffer transmission over the wideband interface 32. Since there are typically multiple queues feeding traffic to each of the interfaces 31 and 32, a packet queue arbiter 25 schedules when each packet queue transmits over the respective interface according to several factors including monitored queue depth, priority, availability, etc.

The interfaces 31 and 32 handle transmissions over the RF channels A and B. In the illustrated example, the narrowband interface 31 utilizes RF channel A for transmission of the narrowband flow1. The wideband interface 32 utilizes a bonded logical channel that extends across both of the physical RF channels A and B such that the data for flow2 and flow3 are distributed over the RF channels A and B.

The scheduler 35 instantiates traffic between the interfaces and RF channels using the logical link queues 37-39. Each of these link queues 37-39 represents the traffic from a particular interface to a particular RF channel for the purposes of claiming and collecting bandwidth from the corresponding RF channel. These are not actual queues but instead logical objects used for rate calculations and scheduling algorithms.

Instantiating the traffic between the interfaces and RF channels using the logical link queues 37-39 produces a second layer of scheduling. This second layer of scheduling will allow the dynamic reallocation to be performed without affecting the arbitration scheme used by the first layer of queuing (the physical queues 21-23). In other words, the physical queues 21-23 can continue to release data to the interfaces 31 and 32 in a same fashion before and after a dynamic reallocation of channel bandwidth, which simplifies integration of the reallocation scheme into existing hardware.

Each link queue polls the interfaces 31 and 32 at certain times to monitor communication activity from an interface to an RF channel. For example, if the link queue 37 polls interface 31 and found no packets from any flows on interface 31 waiting for transmission at the polling time, then there is no communication activity between the narrowband interface 31 and the RF channel A. Conversely, if any of the flows on interface 31 has packets waiting for transmission at the time the link queue 37 polls it, then there is activity between the narrowband interface 31 and the RF channel A at that polling time.

According to a result of the monitoring, the scheduler 35 determines whether to reallocate bandwidth between the interfaces 31 and 32. For example, if a previous polling identified activity between the narrowband interface 31 and the RF channel A and the current polling does not, then some or all of the RF channel A bandwidth allocated to the narrowband interface 31 would be dynamically reallocated to the wideband interface 32. Thus, the dynamic bandwidth reallocation is controlled by monitoring communication activity from the interfaces 31 and 32.

In the present example, other factors 60 besides the existence of communication activity from the interfaces controls dynamic reallocation. The scheduler 35 uses three values for each link queues 37-39. One value is the guaranteed bandwidth for each link queue. Another value is an excessive bandwidth priority weighting for each link queue. This value is based on comparative priorities between the corresponding flows and can be used to skew how excess bandwidth is distributed between the link queues. Another derived value is maximum bandwidth for each link queue, which serves as a ceiling for the distribution of excess bandwidth.

The scheduler 35 then uses these values for the link queues 37-39 along with the maximum physical bandwidth of an RF channel and the existence of communication activity to set the new bandwidth allocation between the interfaces 31 and 32.

To illustrate how the above factors 60 control dynamic reallocation, consider an example where the guaranteed bandwidth is 20 Mbps for link queue 37, 15 Mbps for link queue 38, and 25 Mbps for link queue 39. The excessive bandwidth priority weighting are the same for all the link queues 37-39. The maximum bandwidth for each link queue is set to 65.535 Mbps, which in this example is higher than the total available bandwidth of the RF channel A (38 Mbps). If there is communication activity between interface 31 and RF channel A, and no communication activity between 32 and RF channel A, the scheduler 35 allocates all of the bandwidth of the RF channel A to narrowband interface 31 at least until the next polling. Conversely, if there is no communication activity between interface 31 and RF channel A, and there is communication activity between 32 and RF channel A, then the scheduler 35 allocates all of the bandwidth of the RF channel A to wideband interface 32 at least until the next polling.

Continuing the example, if monitoring indicates communication activity between the RF channel A and both interfaces 31 and 32, then each of the interfaces 31 and 32 is allocated some of the RF channel A bandwidth at an amount controlled by the factors 60. Generally speaking, these amounts are determined by calculating a capped effective bandwidth for each link queue, where an effective bandwidth for each queue is determined by adding its guaranteed bandwidth value to its portion of excess bandwidth as controlled by the priority weightings and then capping this determined effective bandwidth according to the maximum bandwidth for the link queue. The capped effective bandwidths are then used to set the allocated bandwidth for each of the interfaces 31 and 32. The reallocation controls admission of data from the interfaces 31 and 32 at least until the next polling interval where a new reallocation may occur.

In the above example, the monitoring by the scheduler 35 is used to determine whether there is communication between the interfaces 31/32 and the physical channels. In other examples, the monitoring by the scheduler 35 can also identify how much communication activity is present, and these amounts can be factors controlling how much RF channel bandwidth is allocated to each interface.

The above described example can be generally contrasted with some other proposed scheduling schemes at least as follows. The logical channel a service flow uses to transmit packets is often referred to as an interface. Traditionally, an interface either is associated with a physical channel (e.g. a Gigabit Ethernet interface), or shares a common physical channel with a plurality of other interfaces (e.g. PVC interfaces in an Asynchronous Transfer Mode (ATM) network that uses an Optical Carrier (OC)-12 physical channel). For the former case, a single-level scheduler is used, and for the latter case, a single rooted hierarchical scheduler is often used (with the root being the common physical channel). In contrast, the above described example uses two layers of scheduling with multiple roots (physical channels).

The above described example can also be generally contrasted with other proposed scheduling schemes for DOCSIS at least as follows. The bonded (or wideband) and non-bonded (or narrowband) interfaces as introduced with DOCSIS 3.0 are different from the interfaces discussed in the previous paragraph in that they utilize a scheduler capable of handling hierarchies with multiple roots (each root being an RF channel). The interfaces may be connected to the RF channels by a general mesh connection (defined by the bonding group topology). Scheduling schemes then statically partition the underlying RF channel bandwidth among the interfaces and thus leave a significant portion of available RF channel bandwidth unused under certain circumstances even though buffered data is waiting for transmission. In contrast, the CMTS component of the above example dynamically allocates bandwidth between such interfaces while keeping the transmitted data rate within the maximum transmission rate of the underlying RF channels. This significantly improves the RF channel utilization.

Figure 3:
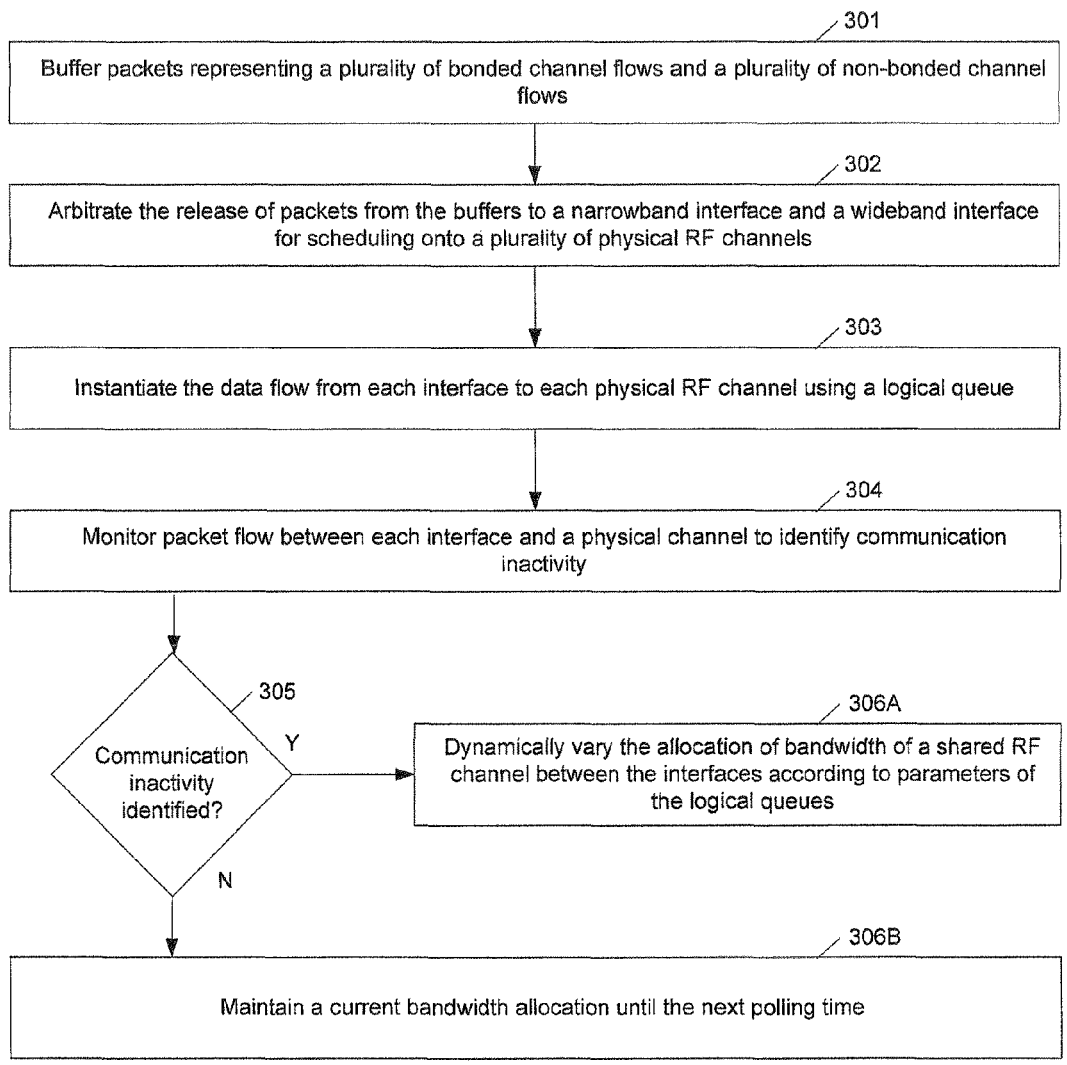
FIG. 3 illustrates how the example bandwidth allocation device shown in FIG. 1 dynamically allocates channel bandwidth.

FIG. 3 illustrates how the example bandwidth allocation device shown in FIG. 1 dynamically allocates channel bandwidth.

In block 301, the bandwidth allocation device buffers packets representing a plurality of bonded channel flows and a plurality of non-bonded channel flows. In block 302, the bandwidth allocation device arbitrates the release of packets from the buffers to a narrowband interface and a wideband interface for scheduling onto a plurality of physical RF channels.

In block 303, the bandwidth allocation device instantiates the data flow from each interface to each physical RF channel using a logical queue. In block 304, the bandwidth allocation device monitors packet flow between each interface and a physical channel to identify communication inactivity.

If communication inactivity is detected in diamond 305, then in block 306A the bandwidth allocation device dynamically varies the allocation of bandwidth of a shared RF channel between the interfaces according to the parameters of the logical queues. If inactivity is detected in diamond 305, then in block 306B the bandwidth allocation device maintains a current bandwidth allocation until the next polling time.

It should be apparent that the principles described above can be applied to both Integrated CMTS (I-CMTS) and Modular CMTS (M-CMTS). In the later case, the bandwidth allocation device can be implemented on the CMTS core, the PHY shelf, or even partitioned between the two.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations, all of which can be referred to as circuitry herein. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An article of manufacture including a computer-readable memory having instructions stored thereon that, in response to execution by a computing device, cause the computing device to perform operations comprising:

passing wideband packets from a first physical queue to a wideband interface for distribution over a plurality of physical Radio Frequency (RF) channels;

passing narrowband packets from a second physical queue to a narrowband interface for transmission over a shared one of the plurality of physical RF channels;

using a scheduler coupled to the wideband interface and the narrowband interface, instantiating traffic flow between the wideband interface and the shared one of the plurality of physical RF channels using a first logical buffer and instantiating traffic flow between the narrowband interface and the shared one of the plurality of physical RF channels using a second logical buffer, wherein using the scheduler further comprises allocating bandwidth of the shared physical RF channel to both the wideband interface and the narrowband interface at a given instant;

identifying when communication from one of the interfaces to the shared physical RF channel is inactive; and varying the allocation of the bandwidth of the shared physical RF channel between the interfaces in response to the identification, wherein the bandwidth allocation is varied according to parameters of the logical buffers.

2. The article of manufacture of claim 1, further comprising a packet queue arbiter configured to control transfer of the packets from the physical queues to the interfaces.

3. The article of manufacture of claim 2, wherein operation of the packet queue arbiter is unaffected by the varying of the allocation of the bandwidth of the shared physical RF channel between the interfaces.

4. The article of manufacture of claim 1, wherein the operations further comprise:
identifying a guaranteed data rate for each of the logical buffers;
wherein the varied allocation is based at least in part on the identified guaranteed data rates.

5. The article of manufacture of claim 4, wherein the operations further comprise:
identifying a priority weighting for each of the logical buffers;
wherein the varied allocation is based at least in part on the identified priority weightings if there is excess bandwidth available after accounting for the guaranteed data rates.

6. The article of manufacture of claim 5, wherein the operations further comprise:
identifying maximum values for each of the logical buffers;
wherein the amount of bandwidth allocated to each interface in the varied allocation is capped by the identified maximum values.

7. The article of manufacture of claim 1, wherein the operations further comprise:
identifying a maximum bandwidth capability of the shared physical RF channel;
wherein the varied allocation is based at least in part on the identified maximum bandwidth capability.

8. A method, comprising:
passing wideband packets from a first physical queue to a wideband interface for distribution over a plurality of physical Radio Frequency (RF) channels;
passing narrowband packets from a second physical queue to a narrowband interface for transmission over a shared one of the plurality of physical RF channels;

using a scheduler coupled to the wideband interface and the narrowband interface, instantiating traffic flow between the wideband interface and the shared one of the plurality of physical RF channels using a first logical buffer and instantiating traffic flow between the narrowband interface and the shared one of the plurality of physical RF channels using a second logical buffer, wherein using the scheduler further comprises allocating bandwidth of the shared physical RF channel to both the wideband interface and the narrowband interface at a given instant;

identifying when communication from one of the interfaces to the shared physical RF channel is inactive; and varying the allocation of the bandwidth of the shared physical RF channel between the interfaces in response to the identification, wherein the bandwidth allocation is varied according to parameters of the logical buffers.

9. The method of claim 8, wherein the plurality of RF channels extends from a Cable Modem Termination System (CMTS).

10. The method of claim 8, further comprising:
identifying a guaranteed data rate for each of the logical buffers;
wherein the varying of the allocation of the bandwidth of the shared physical RF channel between the interfaces is based at least in part on the identified guaranteed data rates.

11. The method of claim 10, further comprising:
identifying a priority weighting for each of the logical buffers;
wherein the varying of the allocation of the bandwidth of the shared physical RF channel between the interfaces is based at least in part on the identified priority weighting if there is excess bandwidth available after accounting for the guaranteed data rates.

12. The method of claim 11, further comprising:
Identifying maximum values for each of the logical buffers;
Wherein the amount of bandwidth allocated to each interface in the varied allocation is capped by the identified maximum values.

13. The method of claim 8, further comprising:
identifying a maximum bandwidth capability of the shared physical RF channel;
wherein the varying of the allocation of the bandwidth of the shared physical RF channel between the interfaces is based at least in part on the identified maximum bandwidth capability.

14. The method of claim 8, further comprising:
buffering a plurality of bonded channel flows and a plurality of non-bonded channel flows; and
arbitrating the release of packets from the buffer to the wideband interface and the narrowband interface.

15. The method of claim 14, wherein the packets are released according to a schedule that is unaffected by the varying of the allocation of the bandwidth of the shared physical RF channel between the interfaces.

16. The method of claim 14, wherein the flows are formatted according to the Data Over Cable Service Interface Specification (DOCSIS).

17. The method of claim 8, wherein the physical RF channels extend to a plurality of cable modems.

* * * * *